US011490335B2

United States Patent
Balasubramanian et al.

(10) Patent No.: US 11,490,335 B2
(45) Date of Patent: *Nov. 1, 2022

(54) LOW POWER MEASUREMENTS MODE

(71) Applicant: Apple Inc., Cupertino, CA (US)

(72) Inventors: Sundarraman Balasubramanian, Nanterre (FR); Vijay Venkataraman, Sunnyvale, CA (US); Alosious Pradeep Prabhakar, Singapore (SG); Nordine Kadri, Groslay (FR); Ali Ehsan, Wokingham (GB); Omar Ali, Houilles (FR); Youcef Benalia, La Verriere (FR); Jordi Agud Ruiz, Tokyo (JP)

(73) Assignee: Apple Inc., Cupertino, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/082,308

(22) Filed: Oct. 28, 2020

(65) Prior Publication Data

US 2021/0045059 A1 Feb. 11, 2021

Related U.S. Application Data

(63) Continuation of application No. 15/843,801, filed on Dec. 15, 2017, now Pat. No. 10,856,230.

(60) Provisional application No. 62/558,118, filed on Sep. 13, 2017.

(51) Int. Cl.
*H04W 52/02* (2009.01)
*G06F 1/3206* (2019.01)
*G06F 1/3234* (2019.01)

(52) U.S. Cl.
CPC ...... *H04W 52/0254* (2013.01); *G06F 1/3206* (2013.01); *G06F 1/3278* (2013.01); *H04W 52/0245* (2013.01); *H04W 52/0248* (2013.01)

(58) Field of Classification Search
CPC ......... H04W 52/0254; H04W 52/0245; H04W 52/0248; G06F 1/3206; G06F 1/3278; Y02D 10/00; Y02D 30/70
See application file for complete search history.

(56) References Cited

U.S. PATENT DOCUMENTS

| 9,014,765 | B2 | 4/2015 | Qi et al. | |
| 9,100,846 | B2 * | 8/2015 | Bodog | H04W 24/00 |
| 9,402,273 | B2 * | 7/2016 | Farajidana | H04W 24/08 |
| 9,497,614 | B1 | 11/2016 | Ridel et al. | |
| 9,891,696 | B2 | 2/2018 | Chng | |
| 2011/0310753 | A1 * | 12/2011 | Chou | H04W 48/16 370/252 |
| 2013/0040640 | A1 * | 2/2013 | Chen | H04W 36/32 455/434 |
| 2013/0242818 | A1 | 9/2013 | Heo et al. | |

(Continued)

FOREIGN PATENT DOCUMENTS

| CA | 2848330 A1 * | 4/2013 | ........ H04W 36/0061 |
| CN | 102781021 A * | 11/2012 | |

(Continued)

*Primary Examiner* — Jay P Patel
(74) *Attorney, Agent, or Firm* — Kowert, Hood, Munyon, Rankin & Goetzel, P.C.

(57) ABSTRACT

This disclosure relates to techniques for selecting a low power measurement mode (LPM mode). A wireless device may enter an idle mode, determine that it is stationary, and enter an LPM mode. In the LPM mode, the wireless device may perform cell measurements at a reduced frequency.

20 Claims, 8 Drawing Sheets

(56) References Cited

U.S. PATENT DOCUMENTS

| | | |
|---|---|---|
| 2013/0288664 A1* | 10/2013 | Bodog .................. H04W 24/10 455/422.1 |
| 2013/0328724 A1 | 12/2013 | Mayor et al. |
| 2013/0343252 A1 | 12/2013 | Chakraborty et al. |
| 2014/0086094 A1* | 3/2014 | Keskitalo .............. H04W 24/08 370/252 |
| 2014/0092799 A1 | 4/2014 | Jain |
| 2014/0266708 A1 | 9/2014 | Warren et al. |
| 2014/0370890 A1 | 12/2014 | Huang et al. |
| 2015/0045020 A1 | 2/2015 | Wang et al. |
| 2015/0271727 A1 | 9/2015 | Harrang |
| 2015/0271763 A1 | 9/2015 | Balachandran et al. |
| 2016/0044619 A1 | 2/2016 | Ryu et al. |
| 2016/0050667 A1 | 2/2016 | Papasakellariou et al. |
| 2016/0081021 A1 | 3/2016 | Abdel-Samad et al. |
| 2016/0094948 A1 | 3/2016 | Kodan et al. |
| 2016/0095093 A1 | 3/2016 | Yi et al. |
| 2016/0205264 A1 | 7/2016 | Kerpez |
| 2016/0316490 A1 | 10/2016 | Wang et al. |
| 2017/0013554 A1 | 1/2017 | Jain et al. |
| 2017/0055192 A1 | 2/2017 | Johansson et al. |
| 2017/0105136 A1 | 4/2017 | Reider et al. |
| 2017/0126338 A1 | 5/2017 | Zaidi et al. |
| 2017/0127196 A1 | 5/2017 | Blum et al. |
| 2017/0164288 A1 | 6/2017 | Iwai |
| 2017/0208549 A1 | 7/2017 | Desai et al. |
| 2017/0245213 A1 | 8/2017 | Martinez Tarradell et al. |
| 2017/0280469 A1 | 9/2017 | Park et al. |
| 2017/0331670 A1 | 11/2017 | Parkvall et al. |
| 2017/0339612 A1 | 11/2017 | Quan et al. |
| 2018/0077624 A1 | 3/2018 | Jung et al. |
| 2018/0192313 A1 | 7/2018 | Axmon et al. |
| 2018/0338268 A1 | 11/2018 | Lee et al. |
| 2018/0367241 A1 | 12/2018 | Hetrick et al. |
| 2019/0037419 A1 | 1/2019 | Knaappila |
| 2019/0045416 A1 | 2/2019 | Hwang et al. |
| 2019/0053244 A1 | 2/2019 | Midh et al. |
| 2019/0021047 A1 | 7/2019 | Zong |

FOREIGN PATENT DOCUMENTS

| | | | | |
|---|---|---|---|---|
| CN | 103096368 A | * | 5/2013 | |
| CN | 102781021 B | * | 3/2015 | |
| CN | 105379337 B | * | 1/2020 | ............ H04W 24/08 |
| KR | 20130141663 A | * | 12/2013 | ............ H04B 17/318 |
| WO | 2014086168 A1 | | 6/2014 | |

\* cited by examiner

```
LTE Random Access Request (MSG1) Report
{
    Preamble Sequence = 3
    Physical Root Index = 216
    Cyclic Shift = 357
    PRACH Tx Power = 9 dBm
    Beta PRACH = 781
    PRACH Frequency Offset = 3
    Preamble Format = 0
    Duplex Mode = FDD
    Density Per 10 ms = 0.5
    PRACH Timing SFN = 92
    PRACH Timing Sub-fn = 4
    PRACH Window Start SFN = 92
    RACH Window Start Sub-fn = 7
    PRACH Window End SFN = 93
    PRACH Window End Sub-fn = 7
    RA RNTI = 5
    PRACH Actual Tx Power = 9 - Tx Power while on Band 3
}
```

FIG. 9

```
LTE Random Access Request (MSG1) Report
{
    Preamble Sequence = 32
    Physical Root Index = 220
    Cyclic Shift = 476
    PRACH Tx Power = 20 dBm
    Beta PRACH = 781
    PRACH Frequency Offset = 3
    Preamble Format = 0
    Duplex Mode = FDD
    Density Per 10 ms = 2
    PRACH Timing SFN = 391
    PRACH Timing Sub-fn = 1
    PRACH Window Start SFN = 391
    RACH Window Start Sub-fn = 4
    PRACH Window End SFN = 392
    PRACH Window End Sub-fn = 4
    RA RNTI = 2
    PRACH Actual Tx Power = 20 - Tx Power on Band 7 which had Low SrxLev
}
```

FIG. 10

```
LTE MAC Rach Attempt
{
   Number of SubPackets = 1
   SubPackets Structure[0] {
      SubPacket ID = 6
      SubPacket - ( RACH Attempt Subpacket ) {
         Version = 2
         Subpacket Size = 40 bytes
         RACH Attempt V2: {
            Retx counter = 7
            Rach result = Failure at MSG2
            Contention procedure = Contention Based RACH procedure
            Msg1 - RACH Access Preamble[0] {
               Preamble Index = 47
               Preamble index mask = Invalid
               Preamble power offset = -86 dB
            }
            Msg2 - Random Access Response {
               Backoff Value = 0 ms
               Result = False
               Rach Data: {
                  TCRNTI = 31168
                  TA value = Not applicable
               }
```

*FIG. 11*

LOW POWER MEASUREMENTS MODE

PRIORITY CLAIM

This application is a continuation of U.S. patent application Ser. No. 15/843,801, entitled "Low Power Measurements Mode," filed Dec. 15, 2017, which claims priority to U.S. provisional patent application Ser. No. 62/558,118, entitled "Low Power Measurements Mode," filed Sep. 13, 2017, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, including to apparatuses, systems and methods for entering and exiting a low power measurements mode in wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 5G NR, HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

As wireless communication technologies and wireless devices implementing those technologies are developed and updated over time, there can be potential for new or updated features, configurations, software, etc., that increase processing requirements and therefore, increase battery use. Further, various circumstances may lead to cell reselections that require significant energy use without significant corresponding user experience benefits. Accordingly, improvements in the field are desired.

SUMMARY

Embodiments are presented herein of apparatuses, systems, and methods to implement a Low Power Measurements Mode (LPM mode). A wireless device may operate in an idle mode and determine that it has remained stationary for at least a certain amount of time. Based at least in part on the stationary status, the device may enter LPM mode. While operating in LPM mode, the device may reduce a rate of performing various cell measurements.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 9-11 illustrate cell measurement reports, according to some embodiments.

Figure 1:
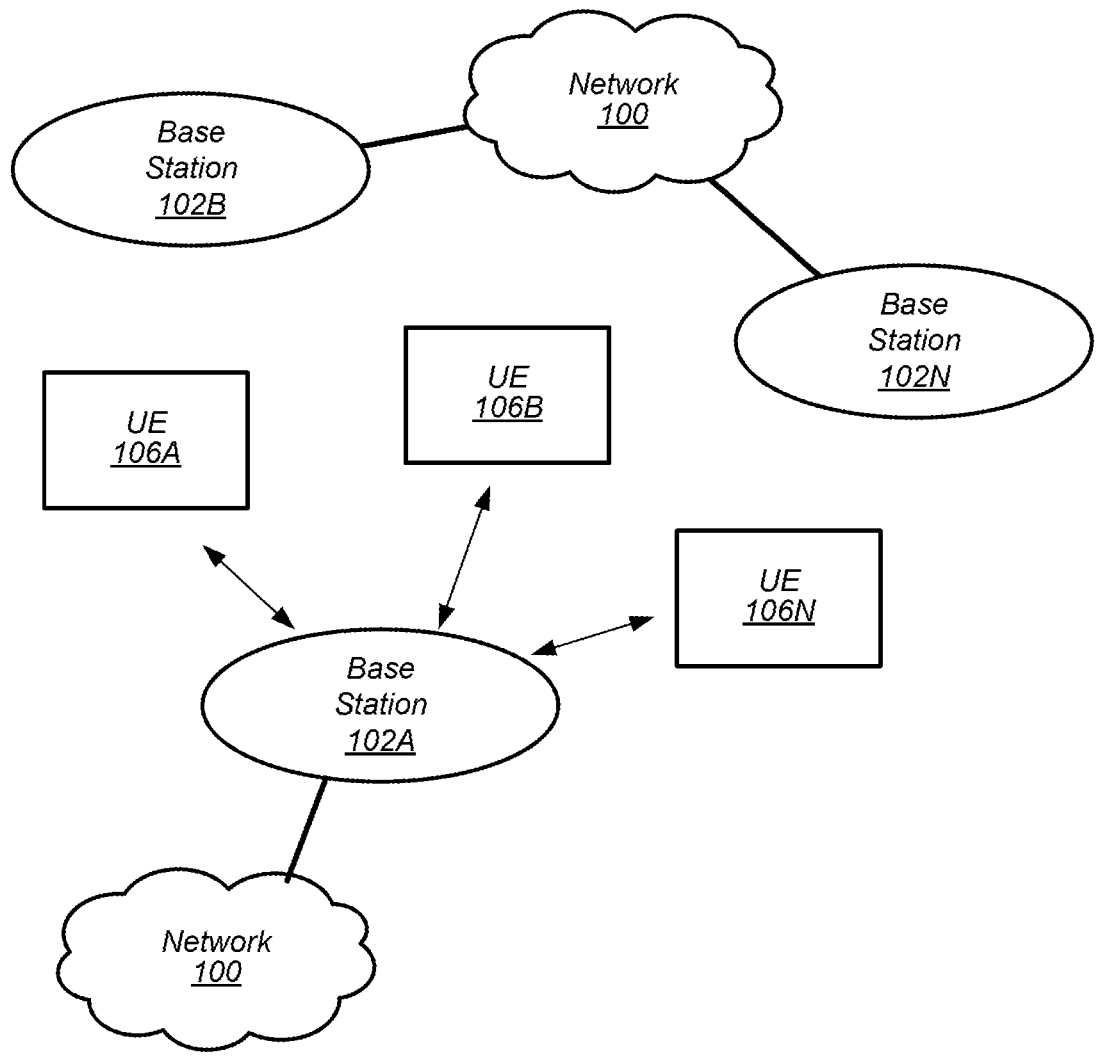
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
E-UTRAN: Evolved UMTS Radio Access Network or Evolved Universal Radio Access Network RRC: Radio Resource Control
NW: Network
dBm: decibel-milliwatt
dB: decibel
LPM mode: Low Power Measurements Mode Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
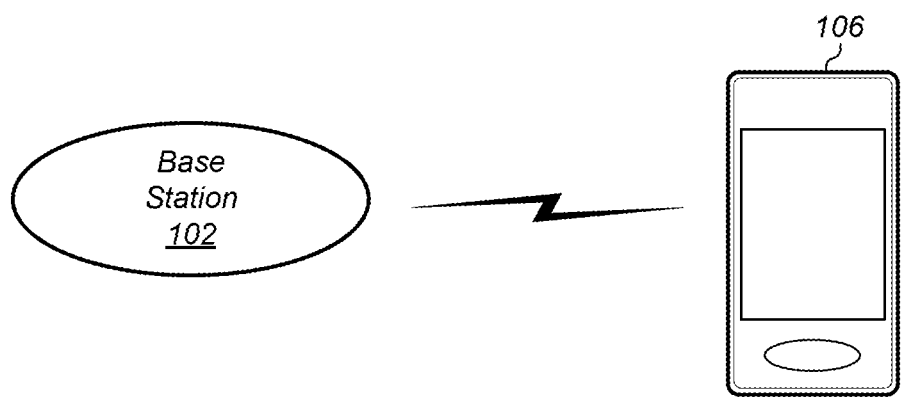
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for entering a low power measurements (LPM) mode, e.g., according to the method of FIG. 5. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
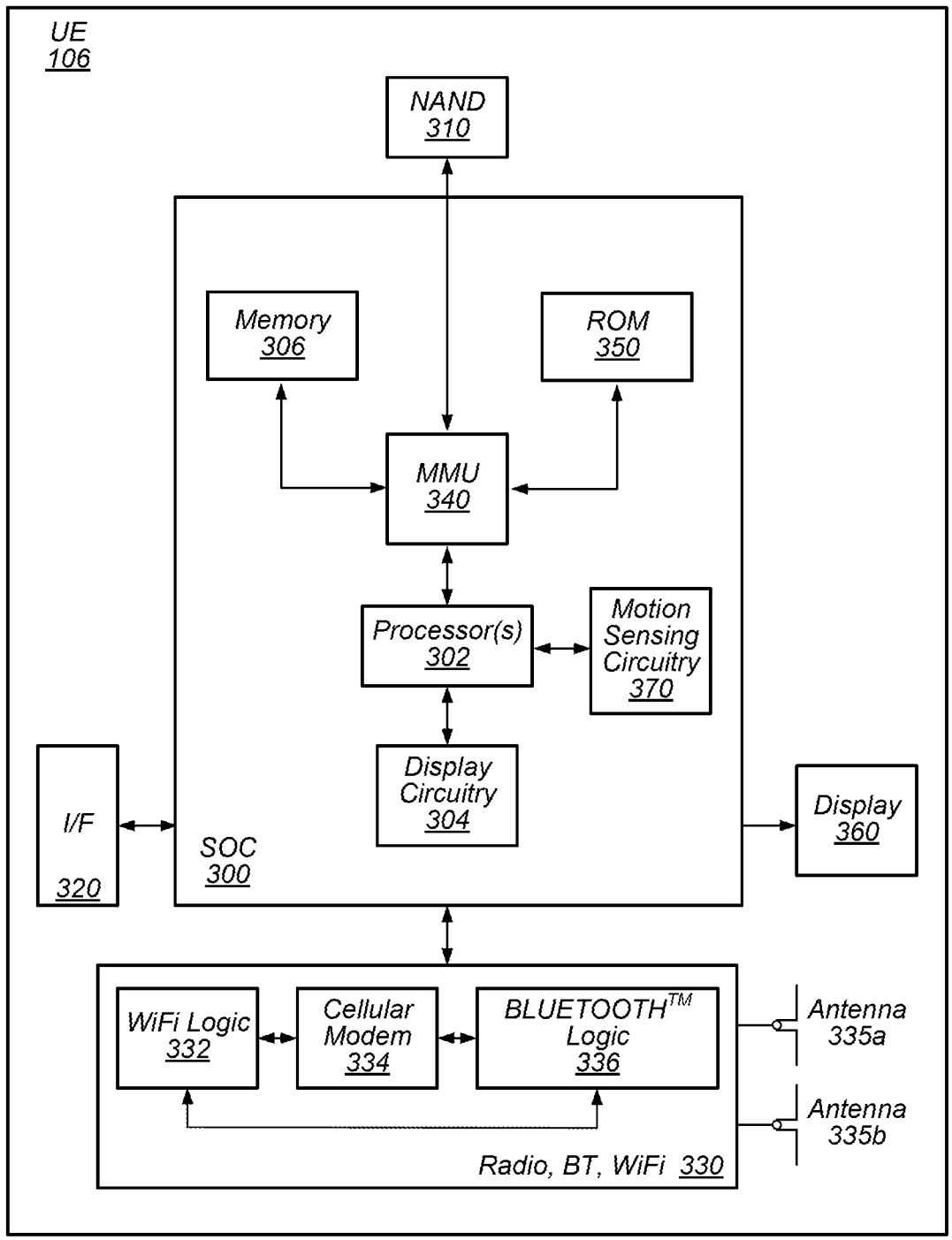
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
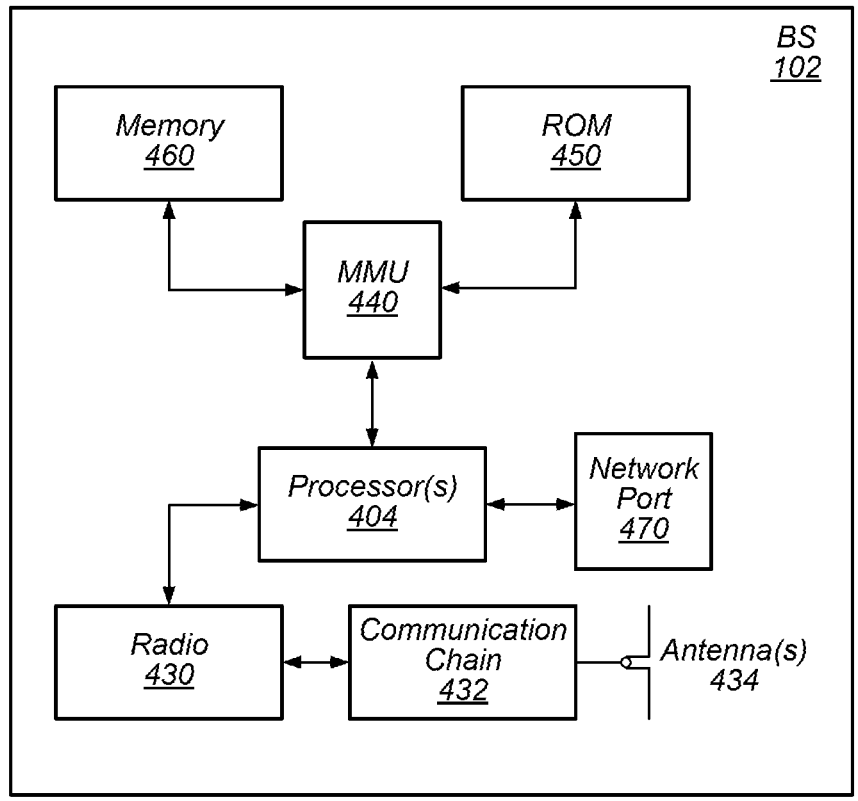
FIG. 4 illustrates an exemplary block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
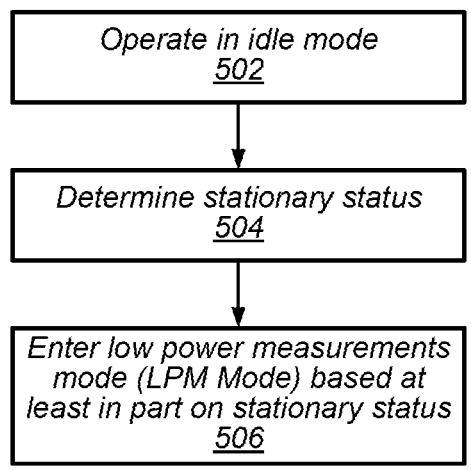
FIG. 5 is a flow chart diagram illustrating an exemplary method for implementing a low power management mode (LPM mode) in wireless communication systems, according to some embodiments.

FIG. 5—Low Power Measurements Mode (LPM mode)

FIG. 5 is a flowchart diagram illustrating one possible embodiment of a scheme to select a Low Power Measurements Mode (LPM mode). According to some embodiments, use of the LPM mode selection scheme depicted in FIG. 5 may result in a wireless device realizing the benefits of LPM mode in circumstances when those benefits are most significant and realizing the benefits of other modes in other circumstances. Aspects of the method of FIG. 5 may be implemented by a wireless device such as a UE 106 illustrated in various of the Figures herein, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

At 502, the wireless device (e.g., UE 106) may enter (and/or operate in) idle mode. In some embodiments, idle mode may be entered due to inactivity of the device (e.g., inactivity of the user and/or inactivity of one or more applications executing on the device). Idle mode may include temporarily disabling one or more features of the device (e.g., turning off a screen, etc.). Idle mode may save power (e.g., extend battery life) relative to operating in various other modes (e.g., active modes).

In some embodiments, the UE may take various actions or perform various functions while operating in idle mode. For example, the device may be connected to an external power source in order to charge. The UE may also monitor and/or connect to one or more wireless networks. For example, the UE may camp on a serving cell.

In some circumstances, the UE may camp on a serving cell and also be in range (e.g., in the boundary of or on the edge of) one or more other cells. In some embodiments, the various cells may have different priority levels (e.g., the UE may determine that one or more cells are higher or lower priority than one or more other cells; the UE may determine an ordered list of cells by priority, etc.). For example, priority of cells may be based on factors including but not limited to: a bandwidth (or throughput or other measures of service quality) available to the UE on one or more of the various cells (e.g., a cell offering higher bandwidth may be considered a higher priority cell), different RATs used by the different cells (e.g., an LTE cell may have a higher priority than a CDMA cell), and/or receiving a priority indication or indications from the cells (e.g., a network may identify certain cells as high or low priority as a load-balancing tool, for example to achieve relatively equal service quality levels across different cells). Cells may be characterized by priority numbers or priority bands, e.g. a mid-priority cell may be characterized as a band 5 or 6 cell on a priority band scale that runs, in this example, from 1 to 10.

In some embodiments, during idle mode, the device may take various measurements of radio link conditions associated with one or more cells using any of various radio access technologies (RATs). These measurements may indicate a service level (SrxLev) and/or service quality (Squal) of one or more cells. Such measurements may include reference signal received power (RSRP), reference signal received quality (RSRQ), received signal strength indication (RSSI), signal-to-noise ratio (SNR), and signal-to-interference and noise ratio (SINR), among other possibilities.

In some embodiments, various technical specifications may specify certain measurement behaviors for UEs in idle mode. For example, 3GPP specifications may require that: 1) a UE measures all the high priority cells (Inter & Intra RAT), 2) that a UE starts measuring intra-frequency low priority cells if the service level of a serving cell falls below a first specified threshold (e.g., according to control information issued by the network such as in a system information block (SIB) message such as a LTE SIB3 message), and 3) that a UE starts measuring inter-frequency and inter-RAT low priority cells if the service level of a serving cell falls below a second specified threshold (e.g., according to control information issued by the network such as in a SIB3 message). In various embodiments (e.g., according to technical specifications or other factors), the device may take measurements at various rates (e.g., with various measurement periods). For example, in some embodiments, a device may take serving cell measurements every 280 ms, intra-frequency measurements every 280 ms, and inter-frequency measurements every 560 ms, among other possibilities (see also FIG. 8).

In some embodiments, the device may camp on a cell (e.g., a serving cell). The device may reselect (e.g., may transition between) different serving cells one or more times. Such cell reselections may be based on one or more various factors. Such factors may include, for example, motion of the device (e.g., changing location), radio link conditions (e.g., quality of one or more wireless connections to one or more cells according to various measurements), and priority of the various cells, among other possibilities. The UE may perform reselections according to the parameters set by the network (e.g., in SIB1, 2, 3, 5 and/or 6 messages).

In some cases (e.g., in the case that a high priority cell has a poor link/service quality relative to a low priority cell), a UE may reselect between multiple cells repeatedly even without changing location. Such reselections may be costly to the UE (e.g., they may cause a reduced battery life, due to transmitting messages associated with reselection, particularly RACH or other messages sent to a cell with poor link quality for which a high transmission power may be used) and to the cells (e.g., time and frequency resources may be occupied for signaling to/from the UE to accomplish reselections, and may be unavailable to other UEs). Accordingly, it may be desired to reduce the number/frequency of reselections for UEs that are stationary while operating in idle mode.

In some embodiments, the wireless device may determine to enter an LPM mode as follows. At 504, while operating in idle mode, the wireless device (e.g., UE 106) may determine that it is stationary, e.g., that it has been stationary for at least a predetermined threshold amount of time.

In some embodiments, the UE may determine that it is stationary based on one or more measurements using various techniques. For example, a UE may use an internal or external motion sensor chip, accelerometer, or similar device or component to determine how or if it is moving. Alternatively, or additionally, a UE may use a global navigational satellite system (GNSS) such as the global positioning system (GPS). Among still further possibilities, a UE may determine its motion status using information provided by other devices (e.g., a companion device using Bluetooth or other short-range communication) or based on cellular and/or WLAN networks (e.g., based on connection to a home Wi-Fi network).

Using any method (e.g., or methods) desired, the UE may determine that it has been stationary (e.g., has not moved) for at least a predetermined threshold amount of time. For example, in some embodiments, the predetermined threshold may be 5 minutes. Other time durations may be used as desired. In some embodiments, the threshold may not be predetermined, and instead may be determined (e.g., or adjusted) dynamically.

At 506, the wireless device (e.g., UE 106) may enter and operate in LPM mode. The determination to enter and operate in LPM mode may be based at least in part on the determination that the device has been stationary for at least the predetermined threshold amount of time.

In some embodiments, operating in LPM mode may include reducing the frequency of cell measurements. For example, some measurements may be avoided entirely while in LPM mode, and/or other measurements may be made less frequently. In some embodiments, all cell measurements (e.g., intra-frequency, inter-frequency, and inter-RAT) may be avoided entirely (e.g., may not be performed) while in LPM mode. Avoiding or reducing such measurements may avoid or reduce cell reselections and related signaling (e.g., RACH). Avoiding or reducing such measurements may reduce the need to wake up during discontinuous reception (DRX) operations, and may extend the battery life of the device.

Operating in LPM mode may include continuing to monitor the network for certain messages (e.g., paging messages, PDCCH, etc.) and transmitting certain messages (e.g., PRACH, PUCCH, PUSCH, etc.) to the network. Such monitoring may be performed based on various settings of the device and/or network. For example, the device may monitor certain channels at certain times according to DRX values set by the network. Similarly, the device may transmit messages to the network to maintain connection and synchronization.

In some embodiments, in addition to a stationary status, the UE may rely on other criteria to determine whether to enter, exit, or remain in LPM mode at any given time. For example, the UE may consider its charging status (which may correlate with its motion state) when determining whether to enter, exit, or remain in LPM mode. Certain locations (e.g., in a user's home or office) may be identified as good or bad candidate locations for LPM mode, and the device may add such locations to a database. Time of day, day of week, or other timing information may also be used.

For example, a UE may determine that the device is typically idle and stationary overnight in a user's home (e.g., from 10 p.m. to 6 a.m.). Time and location information representing such a pattern may be stored and may be used to determine to more rapidly enter (or not enter or to exit) LPM mode in the future. Further, such information may be stored by the device, or it may be stored by a network (e.g., a network may build and maintain such a database) and provided to the device (e.g., via indications to operate in certain ways, such as to enter LPM mode). In some embodiments, the UE may consider indications from the network to enter (or not to enter, or to exit, etc.) LPM mode.

The UE may also consider cell measurements and/or synchronization status (e.g., various thresholds may be used) to determine when to enter, remain in, or leave LPM mode, in some embodiments. For example, a UE may enter LPM mode if all of the following conditions are true: 1) the UE has been stationary and charging for a first amount of time (e.g., 5 minutes or another threshold amount of time), 2) the serving cell RSRP is better than a first RSRP value (e.g., −105 dBm or another value/threshold) and/or SNR is better than a first SNR value (e.g., 0 dB or another value/threshold), and 3) the UE has not gone out of synchronization with the network for at least a first number of subframes (e.g., 10 subframes or another number/threshold of subframes).

In some embodiments, upon entering LPM mode (e.g., prior to, following, or during entering LPM mode), the UE may initiate a scan to identify a preferred cell (e.g., a "best cell") and may camp on it even if it is of low priority. Such a preferred cell may be selected based on cell measurements. For example, a preferred cell may be selected based on offering the highest RSRP, among other possibilities.

In some embodiments, once the device is camped on a preferred cell (e.g., if the preferred cell is low priority or mid priority such as 6 or 5), it may not measure high priority cells until the serving cell RSRP goes below a predetermined value/threshold such as −110 dBm (e.g., even if the measurement criteria are otherwise satisfied) or until the device exits LPM mode. While camped on a preferred cell, the UE may use a minimal (e.g., low) transmission power for uplink transmissions.

In some embodiments, the UE may exit LPM mode if radio link conditions deteriorate. For example, if RSRP is less than the first RSRP value/threshold (e.g., −105 dBm) and/or SNR is less than the first SNR value, the device may exit LPM mode. Additionally, or alternatively, the UE may exit LPM mode based on a page or other message from the network (e.g., a PDCCH) and/or based on the UE going out of synchronization with the network. The device may also exit LPM mode based on a change in charging status, e.g., if it is removed or disconnected from a charger. The device may also exit LPM mode based on motion of the device, e.g., if the device is no longer stationary or moves away from a location associated with LPM mode.

The device and/or the network may build a database of LPM mode disabled locations and/or times. The locations and/or times entered in such a database may be those locations that are not suitable for LPM mode, e.g., due to inadequate service quality. For example, a preferred cell (e.g., a low priority cell with better service quality than a high priority cell) may offer insufficient service quality (e.g., RSRP of a preferred cell below −110 dBm, among other possibilities) for LPM mode operations. In some embodiments, the device may check for the current location and/or time in a disabled location/time database before entering LPM mode. The device may not enter (or may exit) LPM mode based on a current location of the device and/or current time matching one or more entries in such a database.

Figure 6:
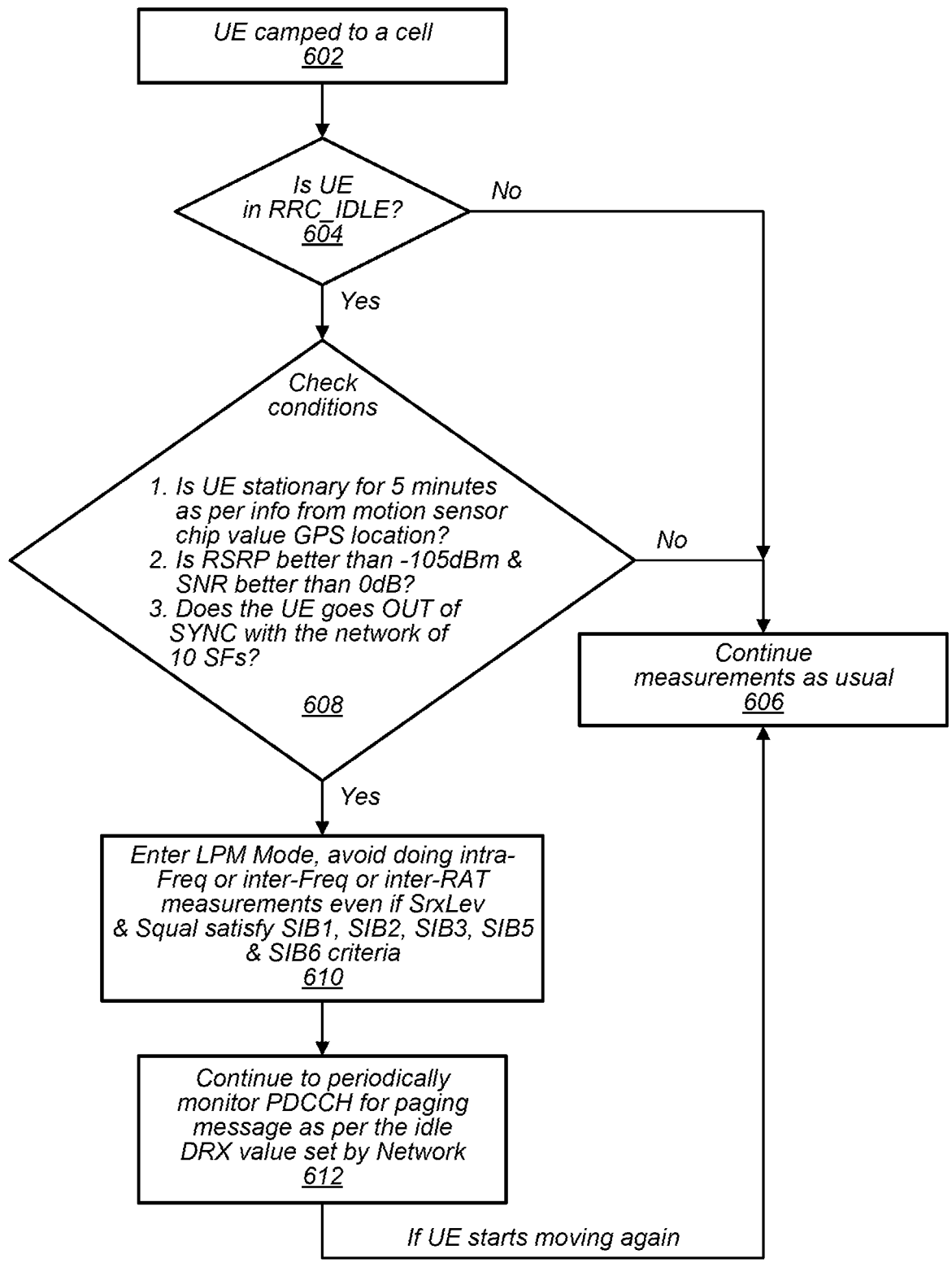
FIG. 6 is a flow chart diagram illustrating an exemplary method to optimize cell reselection using LPM mode, according to some embodiments.

FIG. 6—Optimizing Reselection

FIG. 6 is a flowchart diagram illustrating one possible embodiment of a scheme to optimize cell reselection using LPM mode.

At 602, the UE (e.g., UE 106) may camp on a cell of a wireless network. The cell may be an LTE cell. The UE may remain camped on the cell for any amount of time and may perform any of various operations (e.g., calls, data transmissions, cell measurements, etc.).

At 604, the UE may determine whether it is in an idle mode (e.g., RRC IDLE, for example). The UE may remain camped on the cell and in idle mode for any amount of time and may perform any of various operations (e.g., cell measurements, DRX, etc.). If the UE is not in idle mode, it may continue cell measurements at 606.

At 608, if it was determined that the UE is in idle mode, the UE may determine whether various conditions are true. It is to be appreciated that the illustrated conditions are exemplary only and that other conditions, combinations of conditions, or values may be used. In the illustrated embodiment, the UE may determine that it has remained stationary for 5 minutes, that the RSRP of the serving cell is better than −105 dBm, that the SNR of the serving cell is better than OdB, and/or that the UE has remained in synchronization with the network for 10 subframes (SFs). The UE may use any of various methods to determine whether such conditions are true.

If the UE determines that one, some, or all of the conditions are true, the UE may enter LPM mode at 610; otherwise, the UE may continue cell measurements at 606. In LPM mode (e.g., at 610), the UE may avoid doing various cell measurements, even though the service level and/or service quality may satisfy conditions (e.g., conditions specified in any of various SIBs, among other possibilities) that would otherwise cause the device to take such measurements. In some embodiments and circumstances, avoiding such measurements may have the result of avoiding cell reselection.

At 612, while remaining in LPM mode, the UE may continue to monitor the network for paging messages or other information. Among various possibilities, in the illustrated embodiment, the UE may monitor the PDCCH according to an idle DRX value set by the network. In the illustrated embodiment, the UE may exit LPM mode and resume making cell measurements (e.g., at 606) when/if the UE starts moving (e.g., no longer remains stationary). Other conditions may also cause the UE to exit LPM mode (e.g., activities of the user, paging messages, etc.).

From 606, the method may repeat, e.g., by returning to 602. Such repetition may continue indefinitely.

Figure 7:
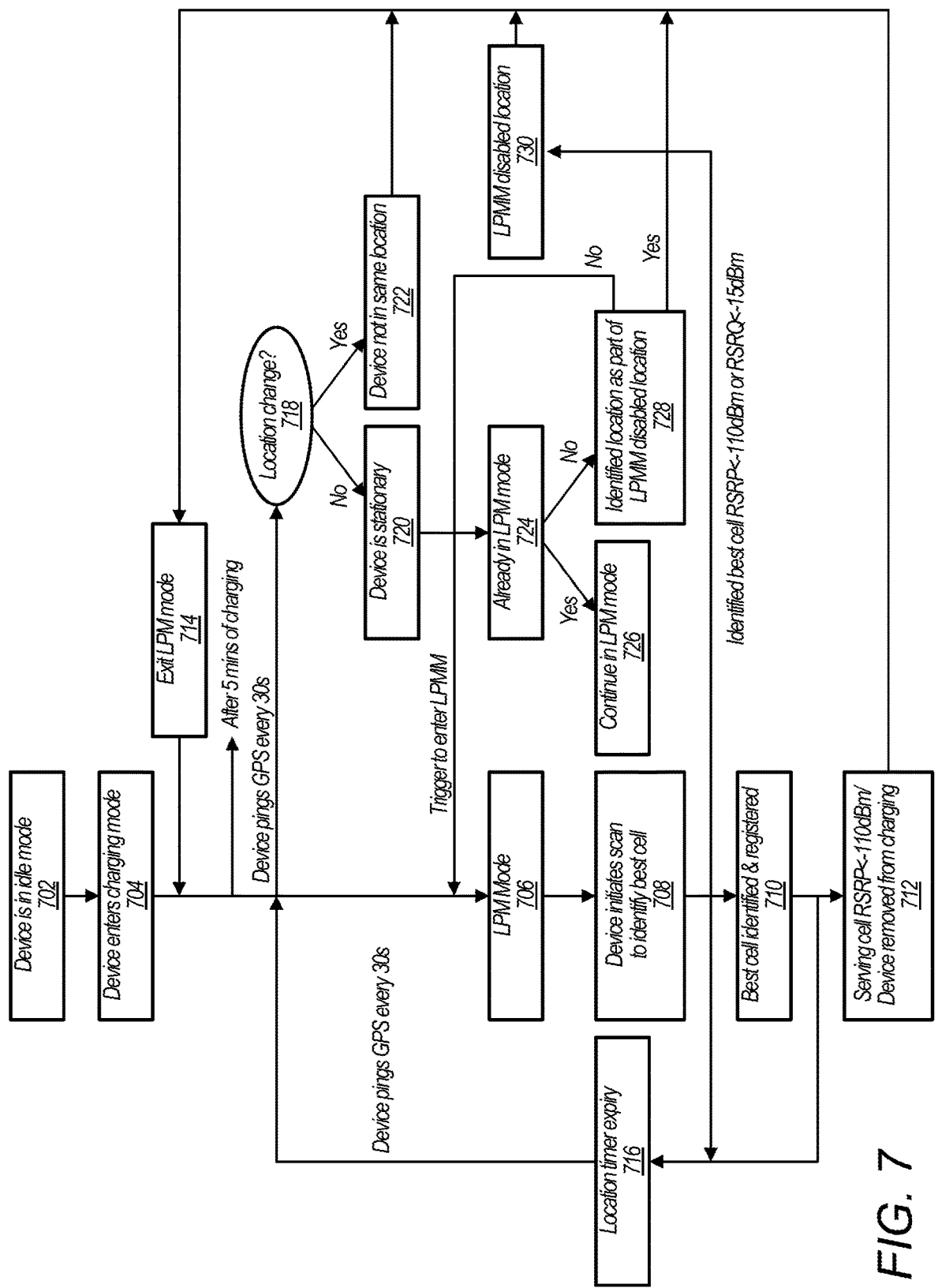
FIG. 7 is a flow chart diagram illustrating an exemplary method to camp on a preferred cell using LPM mode, according to some embodiments.

FIG. 7—Low Power Measurements Mode (LPM mode) to Camp on Best Cell

FIG. 7 is a flowchart diagram illustrating one possible embodiment of a scheme to camp on a preferred cell using LPM mode.

At 702, the device (e.g., UE 106) is in idle mode. The UE may remain in idle mode for any amount of time and may perform any of various operations while in idle mode (e.g., cell measurements, DRX, etc.).

At 704, the UE begins charging (e.g., is connected to an external power source).

After a certain duration of charging (e.g., 5 minutes in the illustrated embodiment, among other possibilities), the device enters LPM mode at 706. In LPM mode the UE may avoid doing various cell measurements or reduce the rate of such measurements.

At 708, the UE may initiate a scan to identify a preferred cell (e.g., a best cell). Such a preferred cell may be selected based on cell measurements. For example, a preferred cell may be selected based on offering the highest RSRP, among other possibilities. A preferred cell may be selected notwithstanding the availability of other, higher priority, cells.

At 710, the UE may register with (e.g., camp on) the preferred cell. The UE may continue LPM mode operations on the preferred cell.

At 712, the UE may detect that one or more conditions may change and determine that LPM mode is no longer appropriate. For example, the UE may determine that the RSRP of the preferred cell is less than a threshold (e.g., <−110 dBM, among other possibilities) and/or that the UE is no longer charging. Other conditions may be considered instead of or in addition to an RSRP value and the charging status.

At 714, the UE may exit LPM mode. The UE may resume taking cell measurements at a non-reduced rate.

At 716, a location timer may expire. In some embodiments, the UE may periodically determine its location at regular time intervals (e.g., every 30s, among other possibilities). The UE may use GPS to determine its location, and/or may use other means. In response to the expiration of the location timer, the device may ping the GPS to redetermine its location.

At 718, the UE may determine (e.g., based on GPS or motion sensor, among other possibilities) whether the location of the UE has changed (e.g., if the location has changed since the previous location measurement). If the location has not changed, it may be determined at 720 that the UE is stationary. Alternatively, if the UE is not stationary (at 722), the UE may proceed to exit LPM mode at 714.

At 724, the UE may determine whether it is already in LPM mode. If already in LPM mode, at 726, the UE may continue operating in LPM mode. The device may reinitiate a location timer. The device may remain camped on the preferred cell, and the method may continue from 710.

If not already in LPM mode, at 728, the UE may determine whether its current location is disabled for LPM mode. If the current location is disabled, the UE may exit LPM mode at 714. If the current location is not disabled, the UE may enter LPM mode at 706.

In some embodiments and under some conditions, the UE at 708 may not identify a preferred cell. For example, no cell may be identified with sufficient signal strength to be selected as a preferred cell. For example, the cell with the best signal strength (e.g., or quality) may not meet certain thresholds. In the illustrated example, the best RSRP may be less than −110 dBM and/or best RSRQ less than −15 dBM, among other possible examples. In these circumstances, at 730, the UE may add the current location to a database of locations for which LPM mode is disabled. The UE may then proceed to exit LPM mode at 714.

Figure 8:
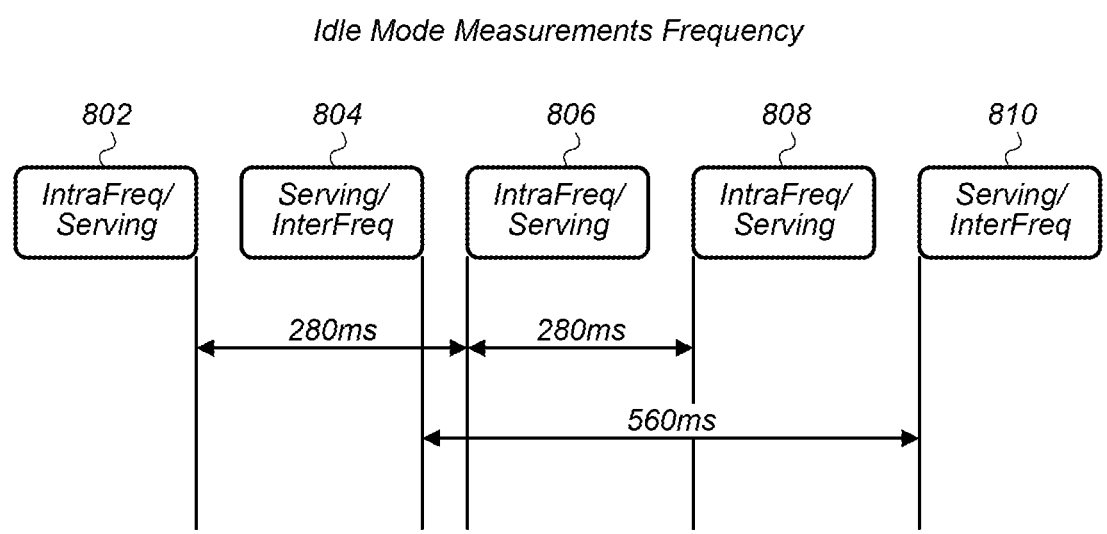
FIG. 8 is a timing diagram illustrating one possible sequence of cell measurements, according to one embodiments.

FIG. 8—Timing of Cell Measurements

FIG. 8 is a timing diagram illustrating one possible sequence of cell measurements. This sequence may represent typical idle mode measurements. A device operating in LPM mode may take measurements less frequently than presented in this exemplary figure.

At each of 802, 806, and 808, the UE (e.g., UE 106) may take intra-frequency cell measurements (e.g., measurements of a neighbor cell or cells within a single frequency band) and measurements of the serving cell. The intra-frequency cell measurements may be taken at regular periodic intervals (e.g., in the illustrated embodiment, they may be taken once every 280 ms). Such measurements may include RSRP and SNR, among various possibilities.

At 804 and 810 the UE may take inter-frequency cell measurements (e.g., measurements of a neighbor cell or cells within different frequency bands) and measurements of the serving cell. Like the intra-frequency measurements, the inter-frequency measurements may be taken at periodic intervals, but they may be taken at a different interval than the intra-frequency measurements (for example, in the illustrated embodiment, they may be taken once every 560 ms). Additionally, as illustrated, they may be taken in between two adjacent intra-frequency measurements. Such measurements may include RSRP and SNR, among various possibilities.

In some embodiments, a pattern of cell measurements similar to the illustrated pattern may continue indefinitely while a UE is operating in idle mode. The timing of the different types of measurements may vary in different embodiments.

FIGS. 9-11—Cell Measurement Messaging Reports

FIG. 9 illustrates the cell measurement report of an exemplary UE on a low-priority cell, according to some embodiments. Note that the UE may use a low transmit power on a cell with high service level. The illustrated example shows a transmit power of 9 dBm for a PRACH while operating on Band 3. Band 3 may represent a low priority cell.

FIG. 10 illustrates the cell measurement report of an exemplary UE on a high-priority cell, according to some embodiments. Note that the UE may use a high transmit power on a cell with low service level. The illustrated example shows a transmit power of 20 dBm for a PRACH while operating on Band 7. Band 7 may represent a higher priority cell. The high transmit power may be associated with the low service quality level.

FIG. 11 illustrates a failed RACH attempt of an exemplary UE, according to some embodiments. In the illustrated example, the UE may have attempted to transmit the RACH seven times prior to returning a RACH failure result.

In the following, further exemplary embodiments are provided.

One set of embodiments may include method for a wireless user equipment (UE) device, the method comprising: entering an idle mode, wherein the UE performs cell measurements at a first rate while in the idle mode; determining that the UE has been stationary for a first amount of time; and entering a low power measurements mode (LPM mode) based at least in part on determining that the UE has been stationary for the first amount of time, wherein the UE performs cell measurements at a second rate, wherein the second rate is smaller than the first rate, while in the LPM mode.

According to some embodiments, the method may further comprise: determining that the UE has remained in a charging state for a second amount of time; and wherein entering the LPM mode is further based at least in part on determining that the UE has been in the charging state for the second amount of time.

According to some embodiments, the method may further comprise: determining that the UE is no longer stationary; and exiting the LPM mode based on determining that the UE is no longer stationary.

According to some embodiments, the method may further comprise: performing a signal strength measurement of a first cell; and wherein entering the LPM mode is further based at least in part on the signal strength measurement of the first cell exceeding a first signal strength threshold.

According to some embodiments, the method may further comprise: determining that the UE has remained synchronized with a first cell for at least a first number of subframes; and wherein entering the LPM mode is further based at least in part on determining that the UE has remained synchronized with the first cell for at least the first number of subframes.

According to some embodiments, the method may further comprise: determining a location of the UE; determining a present time; determining that at least one of the location of the UE and the present time is found in a first database; and wherein entering the LPM mode is further based at least in part on determining that at least one of the location of the UE and the present time is found in the first database.

According to some embodiments, the method may further comprise: determining that a first cell uses a first radio access technology (RAT), and wherein performing cell measurements at the second rate comprises one or more of: avoiding one or more intra-frequency measurements; avoiding one or more inter-frequency measurements; or avoiding one or more measurements of a different RAT.

According to some embodiments, the method may further comprise: performing a signal strength measurement of a first cell; performing a signal strength measurement of a second cell; determining that the signal strength of the second cell exceeds the signal strength of the first cell; determining that the first cell is a higher priority cell than the second cell; and wherein entering the LPM mode further comprises camping on the second cell.

According to some embodiments, determining that the first cell is a higher priority cell than the second cell is based on one or more of: determining that a bandwidth available to the UE on the first cell is greater than a bandwidth available to the UE on the second cell; determining that a RAT of the first cell is a higher priority RAT than a RAT of the second cell; and receiving a priority indication from at least one of the first cell or the second cell.

According to some embodiments, the method may further comprise: after camping on the second cell: performing a subsequent signal strength measurement on the second cell; determining that the signal strength of the second cell is less than a second signal strength threshold; and exiting the LPM mode based at least in part on determining that the signal strength of the second cell is less than the second signal strength threshold.

According to some embodiments, the method may further comprise: determining a location of the UE; and adding the location of the UE to a second database.

According to some embodiments, the method may further comprise: after exiting the LPM mode, determining that the location of the UE is in the second database; determining not to reenter LPM mode based at least in part on determining that the location of the UE is in the second database.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a radio; and
a processor operably connected to the radio and configured to cause the UE to:
 enter an idle mode and camp on a first cell, wherein the UE is configured to perform intra-frequency and/or inter-frequency measurements while in the idle mode;
 determine a motion status of the UE, wherein the motion status is determined over a first amount of time; and
 enter a reduced measurements mode based at least in part on the motion status of the UE over the first amount of time, wherein the UE avoids performing at least one measurement of the intra-frequency and/or inter-frequency measurements while operating in the reduced measurements mode.

2. The UE of claim 1, wherein the processor is further configured to cause the UE to exit the reduced measurements mode based on determining a reference signal received power (RSRP) from the first cell is less than a first RSRP value.

3. The UE of claim 1, wherein the UE avoids performing at least some measurements of high priority while operating in the reduced measurements mode.

4. The UE of claim 1, wherein the processor is further configured to cause the UE to exit the reduced measurements mode based on motion of the UE.

5. The UE of claim 1, wherein the motion status is determined based on a cellular network.

6. The UE of claim 1, wherein entering the reduced measurements mode is further based on a location of the UE.

7. The UE of claim 1, wherein entering the reduced measurements mode is further based on a time of day.

8. An apparatus, comprising:
a processor configured to cause a user equipment device (UE) to:
 enter an idle mode and camp on a first cell, wherein the UE is configured to perform intra-frequency and/or inter-frequency measurements while in the idle mode;
 determine a motion status of the UE, wherein the motion status is determined over a first amount of time; and
 enter a reduced measurements mode based at least in part on the motion status of the UE over the first amount of time, wherein the UE avoids performing at least one measurement of the intra-frequency and/or inter-frequency measurements while operating in the reduced measurements mode.

9. The apparatus of claim 8, wherein the processor is further configured to cause the UE to exit the reduced measurements mode based on determining a reference signal received power (RSRP) from the first cell is less than a first RSRP value.

10. The apparatus of claim 8, wherein the UE avoids performing at least some measurements of high priority while operating in the reduced measurements mode.

11. The apparatus of claim 8, wherein the processor is further configured to cause the UE to exit the reduced measurements mode based on motion of the UE.

12. The apparatus of claim 8, wherein the motion status is determined based on the first cell.

13. The apparatus of claim 8, wherein entering the reduced measurements mode is further based on a location of the UE.

14. The apparatus of claim 8, wherein entering the reduced measurements mode is further based on a determination that the UE has remained synchronized with the first cell for at least a first number of subframes.

15. A method, comprising:
at a wireless user equipment device (UE):
 entering an idle mode and camping on a first cell, wherein the UE is configured to perform intra-frequency and/or inter-frequency measurements while in the idle mode;
 determining a motion status of the UE, wherein the motion status is determined over a first amount of time; and
 entering a reduced measurements mode based at least in part on the motion status of the UE over the first amount of time, wherein the UE avoids performing at least one measurement of the intra-frequency and/or inter-frequency measurements while operating in the reduced measurements mode.

16. The method of claim 15, further comprising exiting the reduced measurements mode based on determining a reference signal received power (RSRP) from the first cell is less than a first RSRP value.

17. The method of claim 15, wherein the UE avoids performing at least some measurements of high priority while operating in the reduced measurements mode.

18. The method of claim 15, further comprising exiting the reduced measurements mode based on motion of the UE.

19. The method of claim 15, wherein the motion status is determined based on a cellular network.

20. The method of claim 15, wherein entering the reduced measurements mode is further based on a location of the UE.

* * * * *